United States Patent [19]
El-Hamamsy et al.

[11] Patent Number: 5,600,187
[45] Date of Patent: Feb. 4, 1997

[54] ELECTRONICALLY CONTROLLABLE CAPACITORS USING POWER MOSFET'S

[75] Inventors: Sayed-Amr El-Hamamsy, Schenectady, N.Y.; Robert S. Scott, Northville, Mich.; Joseph C. Borowiec, Schenectady, N.Y.

[73] Assignee: General Electric Company, Schenectady, N.Y.

[21] Appl. No.: 265,889

[22] Filed: Jun. 27, 1994

[51] Int. Cl.$^6$ ............................................. H01G 7/00
[52] U.S. Cl. ..................... 307/157; 307/109; 361/271; 361/278; 361/280; 361/281; 257/296; 257/312; 315/248
[58] Field of Search ...................... 307/157, 109; 361/277, 271, 278, 280, 281; 257/312, 296; 315/248

[56] References Cited

U.S. PATENT DOCUMENTS

| | | | |
|---|---|---|---|
| 3,961,537 | 9/1972 | Burgess et al. ..................... | 365/188 |
| 4,783,615 | 11/1988 | Dakin . | |
| 4,810,938 | 3/1989 | Johnson et al. . | |
| 4,812,702 | 3/1989 | Anderson . | |
| 4,972,120 | 11/1990 | Witting . | |
| 4,973,922 | 11/1990 | Embree et al. ..................... | 331/108 |
| 5,023,566 | 6/1991 | El-Hamamsy et al. . | |
| 5,039,903 | 8/1991 | Farrall . | |
| 5,047,692 | 9/1991 | Borowiec et al. . | |
| 5,118,997 | 6/1992 | El-Hamamsy . | |
| 5,173,835 | 12/1992 | Cornett et al. ..................... | 257/310 |
| 5,220,194 | 6/1993 | Golio et al. ..................... | 257/601 |
| 5,248,948 | 9/1993 | Shiga ..................... | 331/96 |

*Primary Examiner*—William M. Shoop, Jr.
*Assistant Examiner*—Albert W. Paladini
*Attorney, Agent, or Firm*—Jill M. Breedlove; Marvin Snyder

[57] ABSTRACT

An electrically controllable variable capacitor includes the interelectrode capacitance of at least one power MOSFET, a capacitance connected in series with the MOSFET and having one terminal connected to the drain or source thereof (the series capacitance), and bias control circuitry for controlling the bias voltage applied to the MOSFET. The voltage rating of the MOSFET, the peak amplitude of the applied ac signal, and the value of the series capacitance determine the range of dc bias voltages over which the MOSFET can be operated, and hence the capacitance range of the variable capacitor. Such a variable capacitance is useful as a tuning capacitor in an electrodeless HID lamp ballast.

16 Claims, 5 Drawing Sheets

ELECTRONICALLY CONTROLLABLE CAPACITORS USING POWER MOSFET'S

FIELD OF THE INVENTION

The present invention relates generally to variable capacitors and, more particularly, to an electronically controllable variable capacitor using at least one power MOSFET. Such a variable capacitor is useful, for example, in an electrodeless high intensity discharge lamp ballast.

BACKGROUND OF THE INVENTION

Variable capacitors may be used for automatic circuit tuning. In low power circuits, for example, a varactor, which is a semiconductor device having a junction capacitance that varies with bias voltage, is often used for automatic tuning. For high power, high cost applications, mechanical actuators, e.g., stepper motors, with feedback may be used to control capacitance. Unfortunately, neither of these approaches is suitable for electrodeless high intensity discharge (HID) lamp ballasts, which are typically high power, low cost applications.

In an electrodeless HID lamp, an arc discharge is generated by establishing a solenoidal electric field in a gas contained within an arc tube. The solenoidal electric field is created by the time-varying magnetic field of an excitation coil which is disposed about the arc tube. To maximize efficiency of an HID lamp, the degree of coil coupling between the magnetic field and the arc discharge must be maximized. Since the degree of coupling increases with frequency, electronic ballasts used to drive HID lamps operate at high frequencies in the range from 0.1 to 30 MHz, exemplary operating frequencies being 13.56 and 6.78 MHz. These exemplary frequencies are within the industrial, scientific, and medical (ISM) band of the electromagnetic spectrum in which moderate amounts of electromagnetic radiation are permissible; and such radiation is generally emitted by an electrodeless HID lamp system.

Operation of an HID lamp ballast at the series resonant frequency of the load circuit maximizes power output. However, operation at a frequency slightly higher than the series resonant frequency of the load circuit maximizes ballast efficiency. Hence, for maximum efficiency, operation is slightly "off" resonance, and a specific ballast load resistance and phase angle are required. To this end, the impedance of the ballast load, including that of the arc discharge as reflected into the ballast load, must be matched to the required ballast load resistance and phase angle. As described in commonly assigned, U.S. Pat. No. 5,047,692 of J. C. Borowiec and S-A El-Hamamsy, issued Sept. 10, 1991, which is incorporated by reference herein, a capacitance connected in parallel with the excitation coil is needed to match the resistive component of the ballast load impedance, and a capacitance connected in series with the excitation coil is needed to obtain the proper phase angle. However, the ballast load impedance, and thus the matching conditions, for running and starting the lamp are different. In addition, the circuit is very sensitive to component variations because its quality factor (Q), when the lamp is running, is very high, e.g., 20–40.

Accordingly, it is desirable to provide an automatically variable capacitor useful for tuning an electrodeless high intensity discharge lamp ballast as the output impedance thereof changes between starting and running conditions. In addition, it is desirable that such a variable capacitor be automatically tunable for matching the ballast impedance as it changes due to impedance variations in circuit components.

SUMMARY OF THE INVENTION

An electronically controllable variable capacitor comprises: the output capacitance of at least one power MOSFET, a capacitance connected in series with the MOSFET and having one terminal connected to the drain or source thereof (the series capacitance), and bias control circuitry for controlling the bias voltage applied to the MOSFET. The voltage rating of the MOSFET, the peak amplitude of the applied ac signal, and the value of the series capacitance determine the range of dc bias voltages over which the MOSFET can be operated, and hence the capacitance range of the variable capacitor. The value of the series capacitance is chosen so as to limit the peak amplitude of the ac signal level applied to the MOSFET, thereby avoiding conduction of the MOSFET's body diode and resultant significant power losses, and furthermore to enhance linearity of the capacitance versus voltage curve for the variable capacitor.

A variable capacitance in accordance with the present invention is useful as a tuning capacitor in an electrodeless HID lamp ballast.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
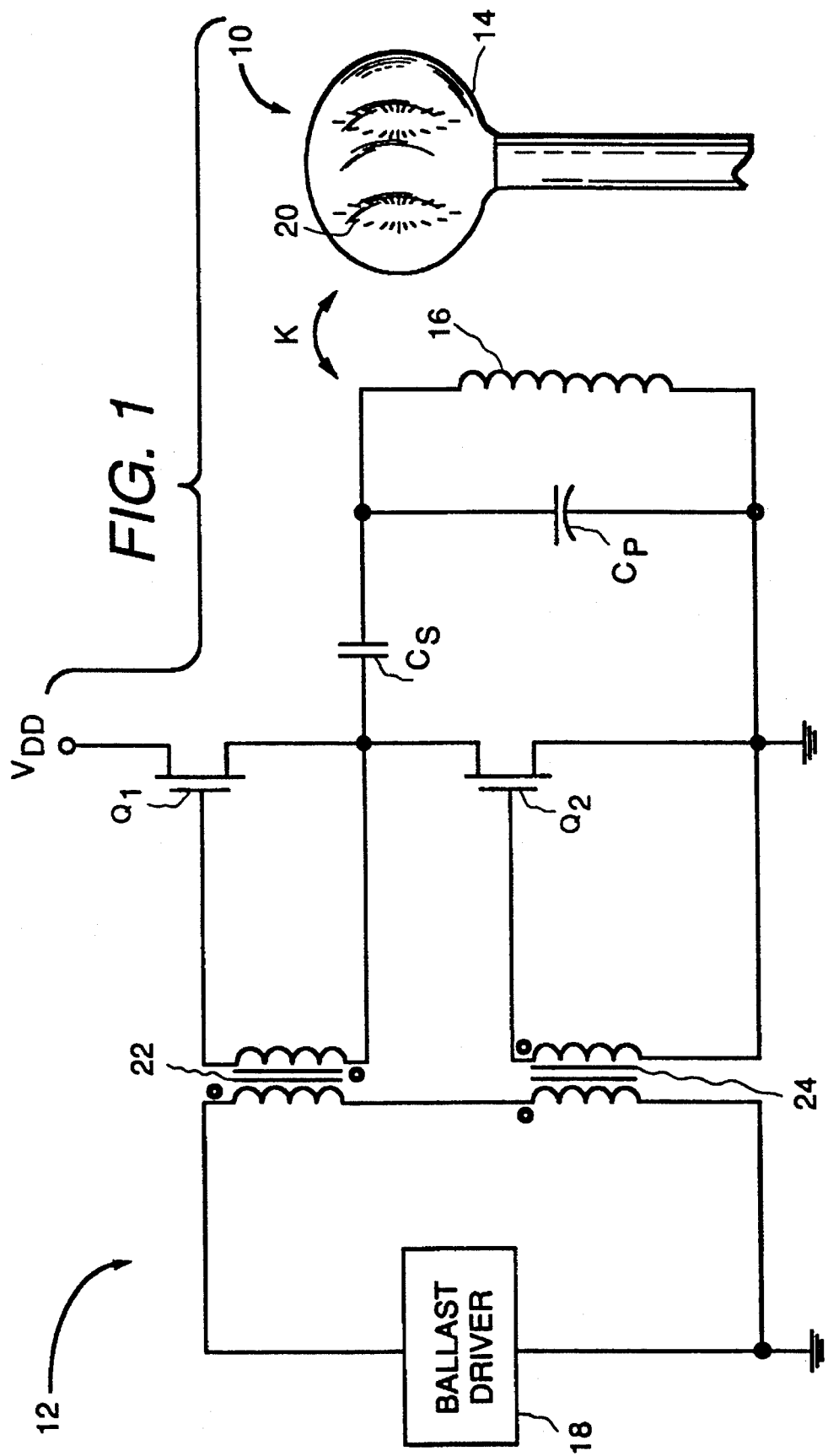
FIG. 1 schematically illustrates an electrodeless HID lamp system including a Class-D ballast.

FIG. 1 is a schematic diagram of an electrodeless HID lamp 10 and associated ballast 12, such as those described in U.S. Pat. No. 5,047,692 of J. C. Borowiec and S-A El-Hamamsy, cited hereinabove. The HID lamp includes an arc tube 14 formed of a high temperature glass, such as fused quartz, or an optically transparent ceramic, such as polycrystalline alumina. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which a solenoidal arc discharge is excited during lamp operation. A suitable fill, described in commonly assigned U.S. Pat. No. 4,810,938 of P. D. Johnson, J. T. Dakin and J. M. Anderson, issued on Mar. 7, 1989, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is hereby incorporated by reference. Another suitable fill, described in commonly assigned U.S. Pat. No. 4,972,120 of H. L. Witting, issued Nov. 20, 1990 and incorporated by reference herein, comprises a combination of a lanthanum halide, a sodium halide, a cerium halide and xenon or krypton as a buffer gas.

Electrical power is applied to the HID lamp by an excitation coil 16 disposed about arc tube 14 which is driven by an rf signal via a ballast driver 18 and ballast 12. (For clarity of illustration, coil 16 is not shown in its operational position about arc tube 14.) A suitable excitation coil 16 may comprise, for example, a two-turn coil having a configuration such as that described in commonly assigned U.S. Pat. No. 5,039,903 of G. A. Farrall, issued Aug. 13, 1991 and incorporated by reference herein. Such a coil configuration results in very high efficiency and causes only minimal blockage of light from the lamp. The overall shape of the excitation coil of the Farrall patent is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is hereby incorporated by reference. In particular, the Anderson patent describes a coil having six turns which are arranged to have a substantially V-shaped cross section on each side of a coil center line. Still another suitable excitation coil may be of solenoidal shape, for example.

In operation, rf current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary electrodeless HID lamp is described in commonly assigned Dakin U.S. Pat. No. 4,783,615, issued on Nov. 8, 1988, which patent is hereby incorporated by reference.

As illustrated in FIG. 1, HID lamp ballast 12 comprises a Class-D power amplifier including two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between fully on and fully off conditions such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in commonly assigned U.S. Pat. No. 5,023,566 of S-A El-Hamamsy and G. Jernakoff, issued Jun. 11, 1991 and incorporated by reference herein.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith, and a blocking/tuning capacitor $C_s$ connected in series with the parallel combination of coil 16 and capacitor $C_p$. The parallel combination of capacitor $C_p$ and coil 16 functions as an impedance transformer to reflect the impedance of the arc discharge 20 into the ballast load. Capacitor $C_s$ is used both for blocking dc voltage and for resonant circuit tuning.

Capacitors $C_s$ and $C_p$ are chosen to ensure impedance matching for maximum efficiency. That is, these capacitors are chosen to ensure that the ballast load is designed for optimum values of resistance and impedance phase angle. As described in U.S. Pat. No. 5,047,692, cited hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitance to yield the required phase angle.

Figure 2:
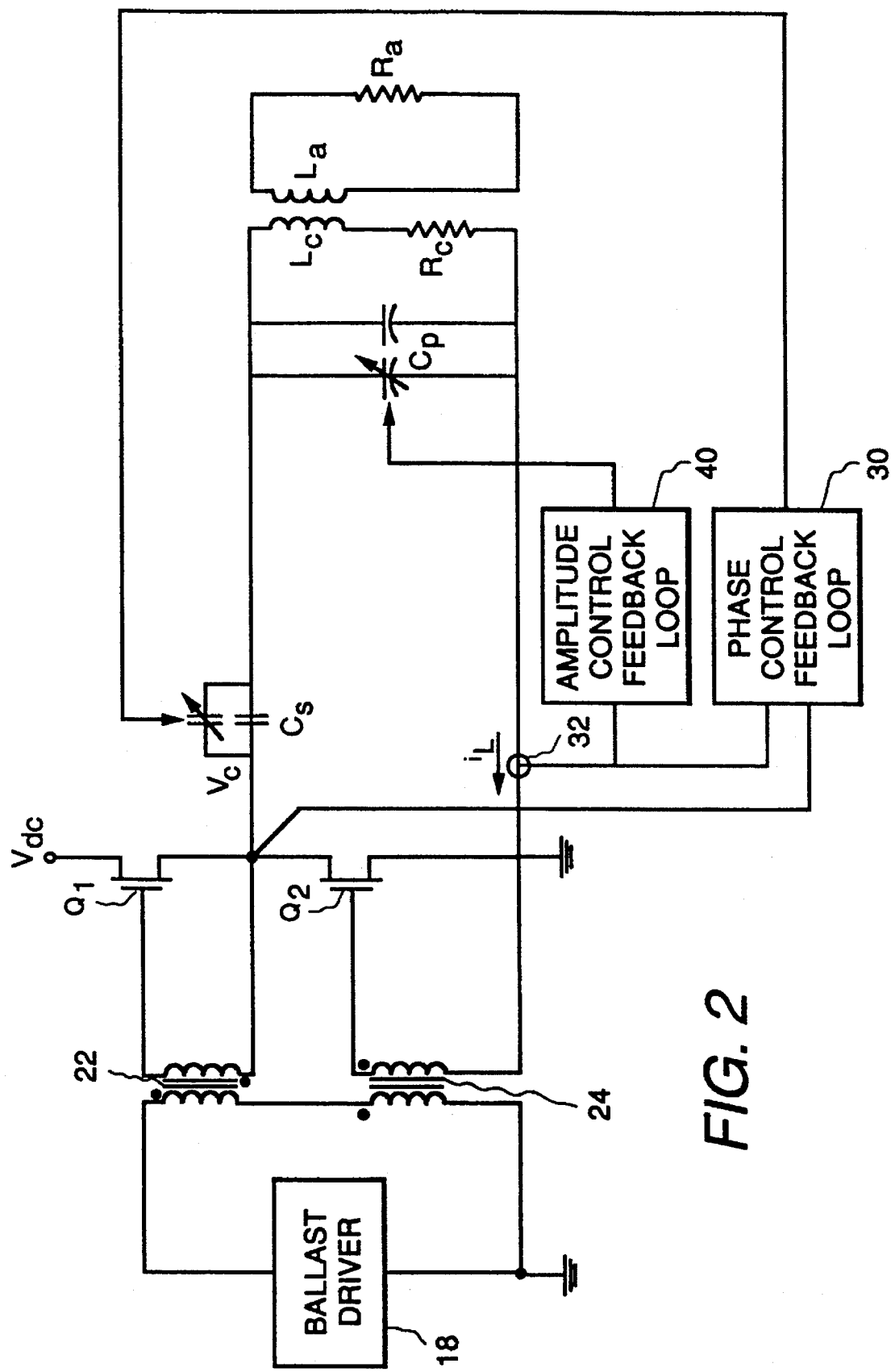
FIG. 2 schematically illustrates a dual feedback control useful for tuning the ballast load impedance of FIG. 1.

Preferably, both tuning capacitors $C_s$ and $C_p$ are variable to provide matching under starting and running conditions as well as for impedance variations in circuit components. FIG. 2 illustrates a dual-feedback control for a Class-D ballast, such as described in commonly assigned U.S. Pat. No. 5,118,997 of S-A El-Hamamsy, issued Jun. 2, 1992 and incorporated by reference herein, useful for controlling the values of capacitances $C_s$ and $C_p$ to match the ballast load impedance under changing conditions. A phase control feedback loop 30 varies the value of series tuning capacitor $C_s$ to provide load phase angle control; and an amplitude control feedback loop 40 varies the value of parallel tuning capacitor $C_p$ to provide load amplitude control. In FIG. 2, $L_c$ represents the inductance and $R_c$ represents the resistance of coil 16; $L_a$ represents the inductance and $R_a$ represents the resistance of the arc discharge; and k is the coupling coefficient between the coil and the arc discharge.

In accordance with the present invention, an electrically controllable variable capacitor is provided which would be useful for implementing either or both tuning capacitors $C_s$ and $C_p$ of the HID lamp ballast of FIGS. 1 and 2.

Figure 3:
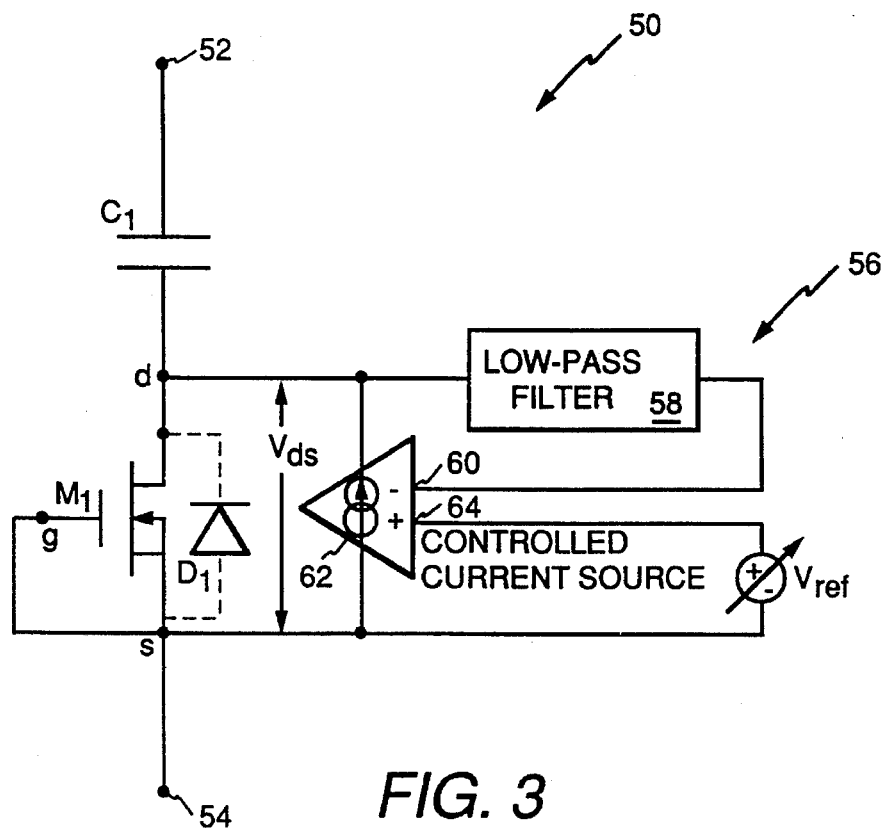
FIG. 3 schematically illustrates one embodiment of a variable capacitor according to the present invention.

FIG. 3 illustrates one embodiment of an electrically controllable variable capacitor 50 according to the present invention with capacitor terminals 52 and 54. Variable capacitor 50 comprises at least one power MOSFET $M_1$, shown by way of illustration only as an N-channel power MOSFET, connected in series at its drain terminal d to a series capacitance $C_1$. The gate terminal g and source terminal s of MOSFET $M_1$ are connected together. Bias voltage control circuitry 56 is connected across the drain and source terminals of the MOSFET. Bias voltage control circuitry 56 comprises a low-pass filter 58 connected between the drain terminal d of the MOSFET and the inverting terminal 60 of a controlled current source shown as an operational amplifier 62. A reference voltage $V_{ref}$ is connected between the source terminal s of the MOSFET and the noninverting terminal 64 of controlled current source 62.

The effective capacitance of variable capacitor 50 is taken between terminals 52 and 54 and comprises the series combination of series capacitance $C_1$ and the output capacitance of the MOSFET. The output capacitance of the MOS- FET comprises the sum of its drain-to-source capacitance and its drain-to-gate capacitance. Both of these interelectrode capacitances vary with the drain-to-source voltage $V_{ds}$ applied to the MOSFET. As the voltage $V_{ds}$ increases (e.g., becomes more positive for an N-channel MOSFET), the interelectrode capacitances decrease over normal operating biases, thus decreasing the total capacitance between terminals 52 and 54.

Capacitance $C_1$ performs several functions in the variable capacitor arrangement of the present invention. It blocks dc voltage between terminals 52 and 54 from being applied to the MOSFET. As a result, the dc bias voltage $V_{ds}$ across MOSFET $M_1$ is separately controllable by circuitry 56. Moreover, as long as the capacitance $C_1$ is not much larger than the output capacitance of the MOSFET, capacitance $C_1$ reduces the ac signal voltage applied between the MOSFET's drain and source terminals. This is important because the drain-to-source voltage $V_{ds}$ of the MOSFET must not become less than zero; otherwise, the integral body diode $D_1$ (shown in phantom) of the MOSFET will become conductive, resulting in a significant power loss. As a result, the least positive dc bias that can be applied to MOSFET $M_1$ is approximately equal to the peak amplitude of the ac signal swing across MOSFET $M_1$; and the most positive dc bias that can be applied to MOSFET $M_1$ is its maximum rated drain-to-source voltage $V_{ds}$ minus the peak amplitude of the ac signal voltage across MOSFET $M_1$. Hence, the voltage rating of the MOSFET, the peak amplitude of the applied ac signal, and the value of the series capacitance $C_1$ determine the range of dc bias over which the MOSFET can be operated. In addition, by limiting the peak amplitude of the ac signal applied to the MOSFET, the capacitance $C_1$ also serves to enhance the linearity of the capacitance versus voltage curve for variable capacitor 50.

Bias voltage control circuitry 56 is used to control the bias voltage $V_{ds}$ as follows. Low-pass feedback filter 58 blocks the high-frequency (e.g., rf) signal component of the drain-to-source voltage $V_{ds}$ and provides a voltage representing the dc bias component of $V_{ds}$ to the inverting input 60 of controlled current source 62. The difference between this voltage and the reference voltage $V_{ref}$ causes the current source to attempt to maintain the dc bias on MOSFET $M_1$ at the value $V_{ref}$. The ac output impedance of the bias voltage control circuitry is made very high at the signal frequency so that most of the signal current passes through the output capacitance of MOSFET $M_1$.

Figure 4:
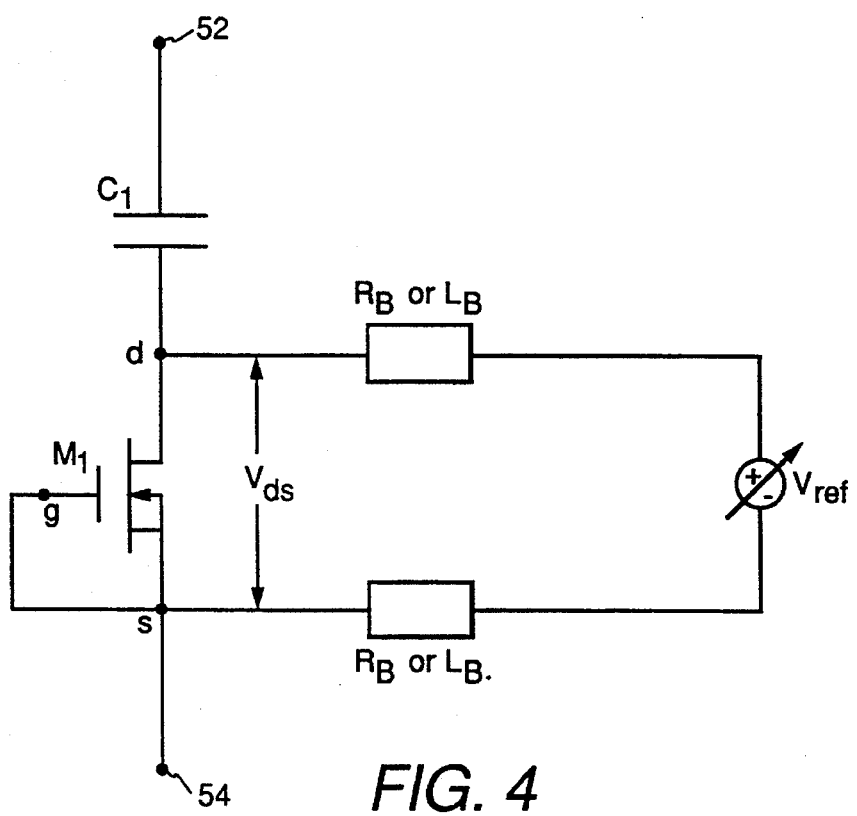
FIG. 4 schematically illustrates an alternative embodiment of a variable capacitor according to the present invention.

In alternative embodiments, other bias networks which have a high ac output impedance are used to bias MOSFET $M_1$. For example, the voltage source $V_{ref}$ could be connected to the drain d of MOSFET $M_1$ through an inductor, a resistor, or a series combination of an inductor and resistor. FIG. 4 shows a practical implementation of the current source 62 (FIG. 3) with voltage source $V_{ref}$ in series with a relatively large resistance and/or a relatively large inductance. For example, assuming a large resistance $2R_B$ is used, the resistance $2R_B$ has two purposes; one is to apply the bias voltage across the MOSFET's drain and source terminals, and the other is to provide a high impedance to limit rf current through the bias voltage source $V_{ref}$.

Figure 5:
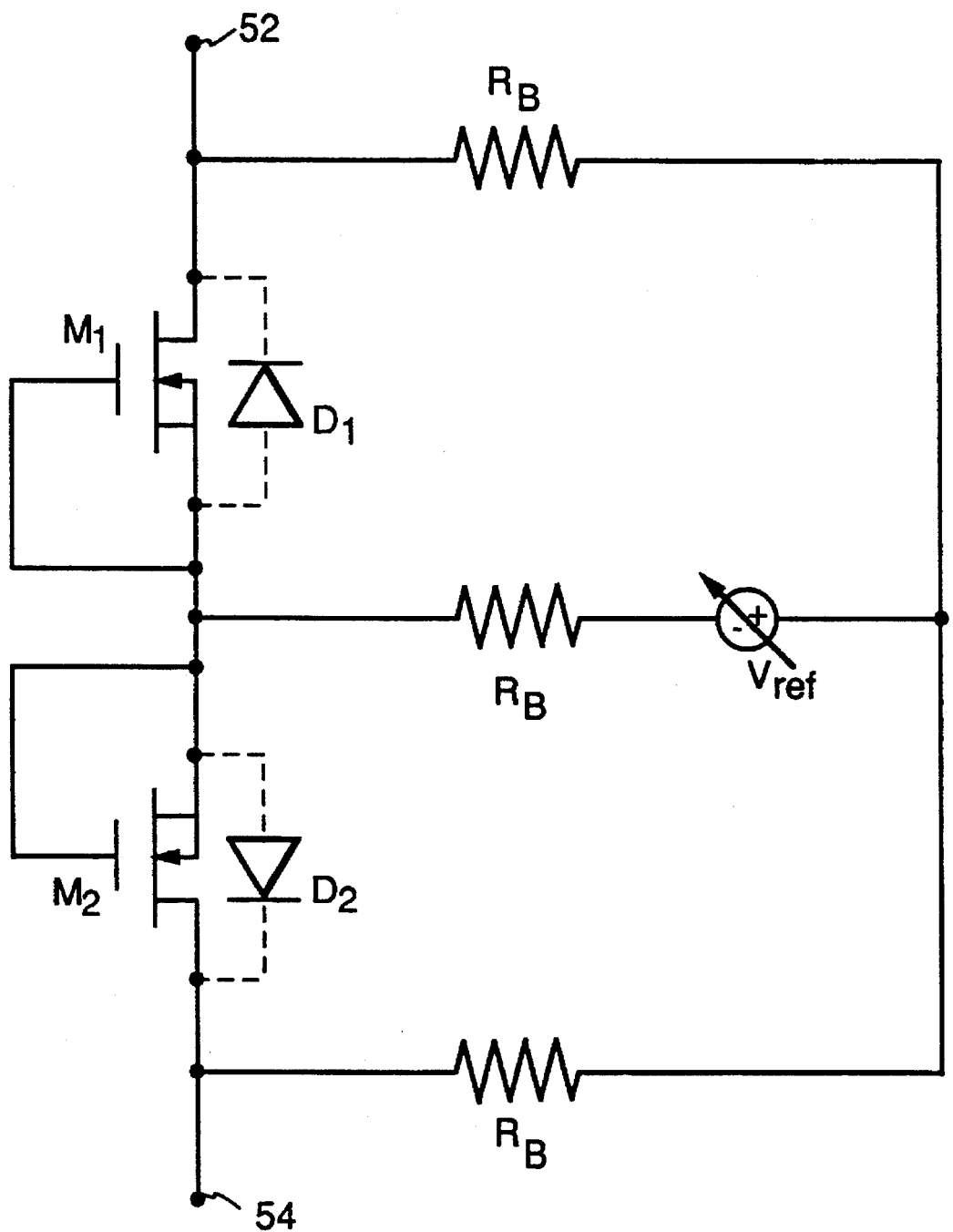
FIG. 5 schematically illustrates another alternative embodiment of a variable capacitor according to the present invention.

FIG. 5 shows an alternative embodiment of a variable capacitor according to the present invention wherein the fixed capacitor $C_1$ of FIGS. 3 and 4 is replaced with another MOSFET $M_2$. The MOSFET's $M_1$ and $M_2$ are arranged such that the anodes of their integral body diodes $D_1$ and $D_2$ are connected together. The voltage $V_{ref}$ is applied with the polarity shown in order to reverse bias both body diodes. (Alternatively, the MOSFET's could be connected in the opposite direction, that is, with the cathodes of their body diodes connected together. When connected in this fashion, the polarity of $V_{ref}$ must be reversed.) The dc voltage $V_{ref}$ must be high enough so that when the rf voltage is in the forward direction across one of the MOSFET's, the body diode of the MOSFET does not turn on. If the capacitances of the MOSFET's were equal at all times, the dc voltage would have to be greater than or equal to one-half the peak amplitude of the rf voltage. However, the output capacitance of each MOSFET changes with rf voltage applied thereto. As the capacitance increases when the applied total voltage (rf and dc) is decreased, the voltage division across the two MOSFET's is not equal, but rather the voltage across the one having the larger output capacitance is smaller. Therefore, the applied dc voltage $V_{ref}$ can be somewhat smaller than one-half the peak amplitude of the rf voltage without causing any problems. At the other end of the rf voltage swing, the dc voltage plus the rf voltage across either MOSFET must not exceed the voltage rating of the device. Because the voltage division between the MOSFET's is unequal, the maximum applied dc voltage has to be somewhat less than the maximum voltage rating for the MOSFET minus one-half the peak amplitude of the rf voltage applied thereto.

Either or both tuning capacitors $C_s$ and $C_p$ of the lamp ballast of FIGS. 1 and 2 can be implemented using a variable capacitor according to the present invention. By controlling the bias voltage $V_{ref}$ of such a variable capacitor, the circuit can be electronically tuned for optimum operation during both starting and running conditions and can be adjusted to account for variability in the other components in the circuit.

Figure 6:
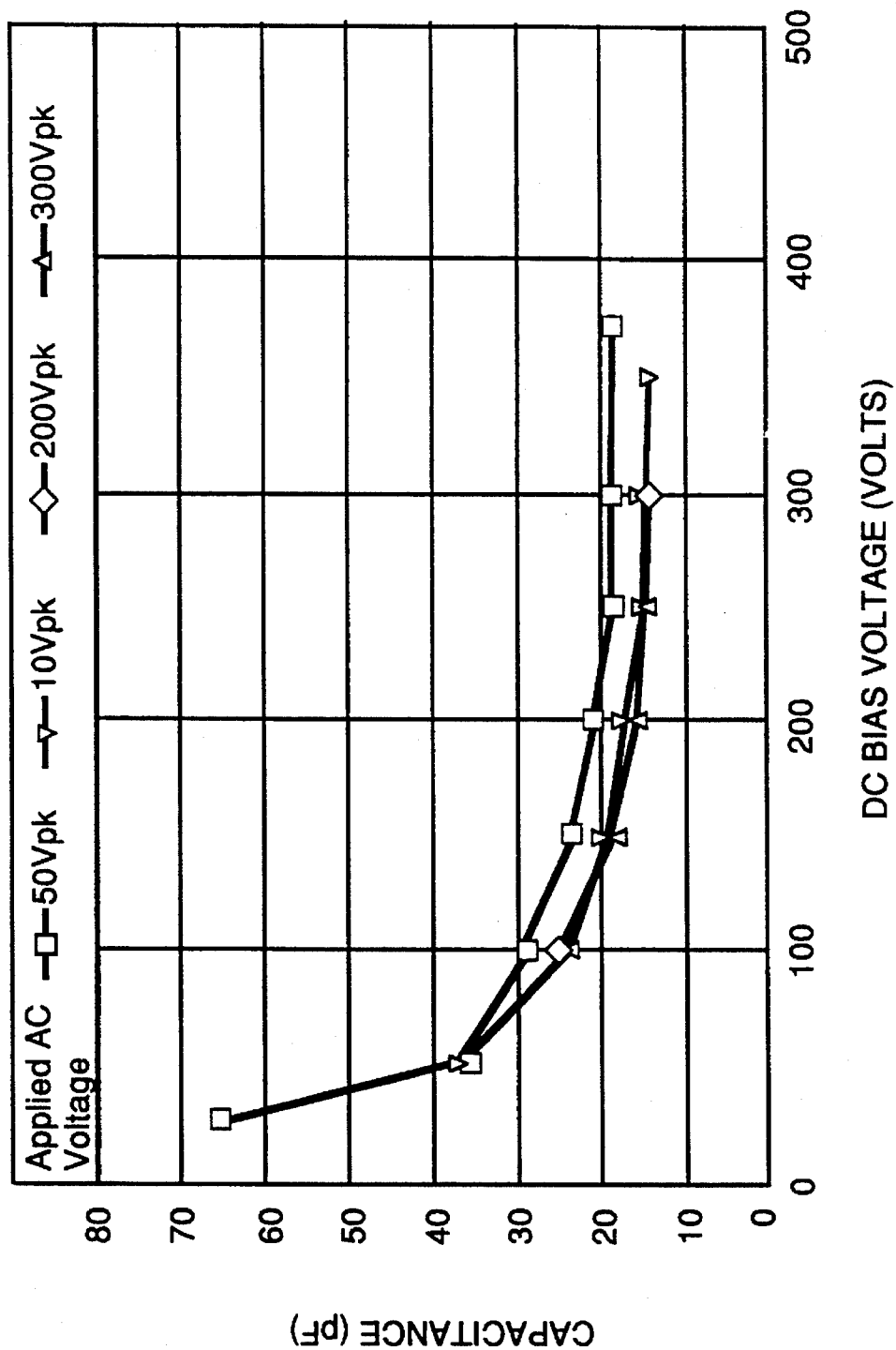
FIG. 6 graphically illustrates exemplary capacitance versus dc bias voltage data for the variable capacitor of FIG. 5.

FIG. 6 graphically illustrates exemplary capacitance versus dc bias voltage data for various applied ac voltages for the variable capacitor of FIG. 5.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A variable capacitor, comprising:

the output capacitance of at least one power MOSFET, said power MOSFET having drain, gate and source terminals, said gate and source terminals being connected together, said power MOSFET further having a body diode integral therewith;

a series capacitance connected in series with said MOSFET and having one terminal connected to the drain or source thereof; and bias control circuitry for controlling a bias voltage applied to said MOSFET in a predetermined range of voltages depending on the voltage rating of said MOSFET, the peak amplitude of an ac signal applied to said MOSFET, and the value of said series capacitance, said bias control circuitry having a high impedance at operating frequencies therefor, the capacitance of said variable capacitor varying with said bias voltage.

2. The variable capacitor of claim 1 wherein said bias control circuitry comprises a controlled current source.

3. The variable capacitor of claim 2 wherein said controlled current source comprises a voltage source connected in series with a relatively large resistance.

4. The variable capacitor of claim 2 wherein said controlled current source comprises a voltage source connected in series with an inductance.

5. The variable capacitor of claim 1 wherein the value of said series capacitance is selected so as to limit the peak amplitude of said ac signal applied to the MOSFET.

6. The variable capacitor of claim 1 wherein said series capacitance comprises the output capacitance of another power MOSFET connected in series with said at least one power MOSFET such that the anodes or cathodes of the integral body diodes of said MOSFET's are connected together.

7. The variable capacitor of claim 6 wherein said bias control circuitry comprises a controlled current source.

8. The variable capacitor of claim 6 wherein said controlled current source comprises a voltage source connected in series with a resistance or an inductance so as to reverse bias the body diodes of said MOSFET's.

9. A ballast for an electrodeless high intensity discharge lamp of the type having an excitation coil situated about an arc tube for exciting an arc discharge therein upon application of a radio frequency signal to said excitation coil, said ballast comprising:

at least one switching device;

a ballast driver coupled to said switching device for driving said switching device; and a resonant circuit coupled to said switching device, said resonant circuit comprising said excitation coil and at least one variable capacitor;

said variable capacitor comprising the output capacitance of at least one power MOSFET, said power MOSFET having drain, gate and source terminals, said gate and source terminals being connected together, said power MOSFET further having a body diode integral therewith, said variable capacitor further comprising a series capacitance connected in series with said MOSFET and having one terminal connected to the drain or source thereof, said variable capacitor further comprising bias control circuitry for controlling a bias voltage applied to said MOSFET in a predetermined range of voltages depending on the voltage rating of said MOSFET, the peak amplitude of an ac signal applied to said MOSFET, and the value of said series capacitance, said bias control circuitry having a high impedance at operating frequencies therefor, the capacitance of said variable capacitor varying with said bias voltage.

10. The ballast of claim 9 wherein said bias control circuitry comprises a controlled current source.

11. The ballast of claim 10 wherein said controlled current source comprises a voltage source connected in series with a relatively large resistance.

12. The ballast of claim 10 wherein said controlled current source comprises a voltage source connected in series with an inductance.

13. The variable capacitor of claim 9 wherein the value of said series capacitance is selected so as to limit the peak amplitude of said ac signal applied to the MOSFET.

14. The ballast of claim 9 wherein said series capacitance comprises the output capacitance of another power MOSFET connected in series with said at least one power MOSFET such that the anodes or cathodes of the integral body diodes of said MOSFET's are connected together.

15. The ballast of claim 14 wherein said bias control circuitry comprises a controlled current source.

16. The ballast of claim 15 wherein said controlled current source comprises a voltage source connected in series with a resistance or an inductance so as to reverse bias the body diodes of said MOSFET's.

* * * * *